May 11, 1926.
A. M. CLOUGH
WINDSHIELD FOR TRACK CARS
Filed Oct. 8, 1924
1,584,432
2 Sheets-Sheet 1
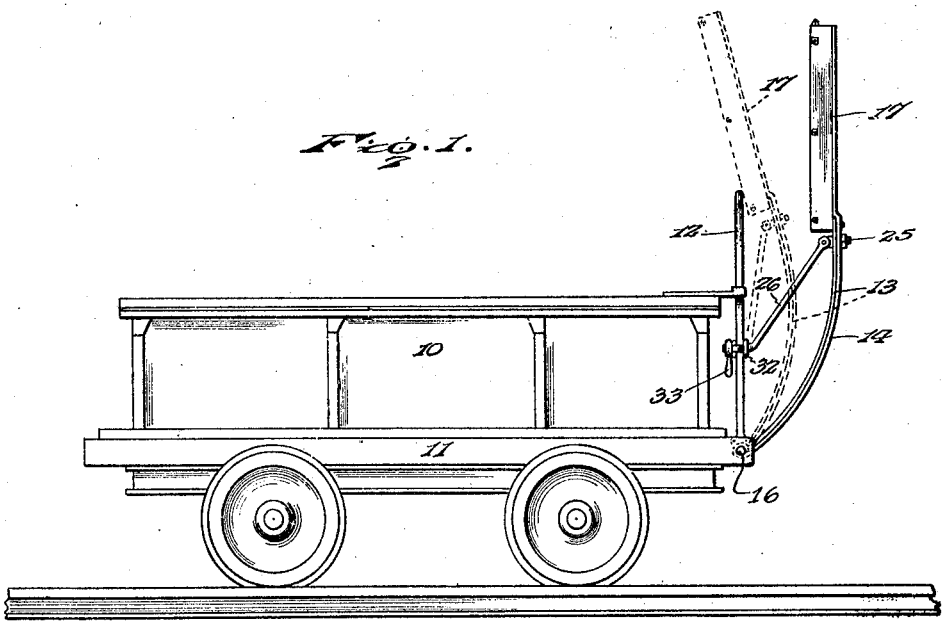
Inventor
A. M. Clough.
By Lacy & Lacy, Attorneys May 11, 1926.
A. M. CLOUGH
WINDSHIELD FOR TRACK CARS
Filed Oct. 8, 1924
1,584,432
2 Sheets-Sheet 2
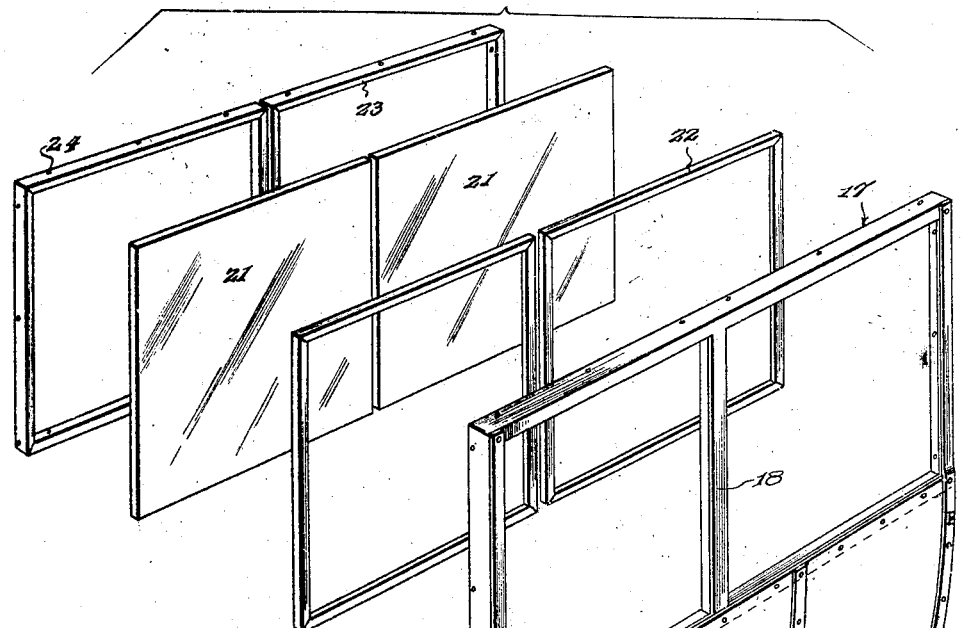
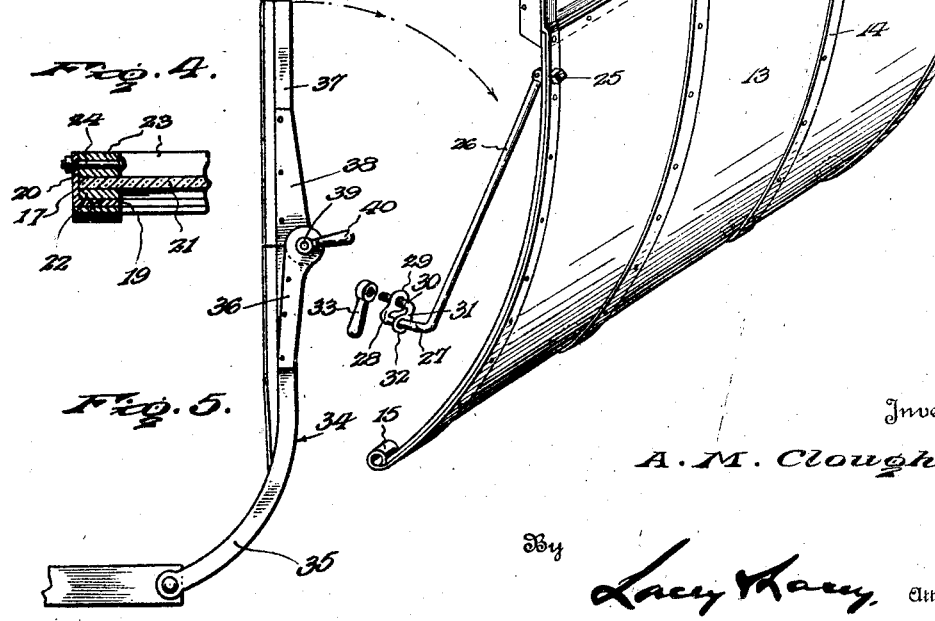
Inventor
A. M. Clough.
By Lacey Lacey, Attorneys Patented May 11, 1926.

1,584,432

UNITED STATES PATENT OFFICE.

ANDREW M. CLOUGH, OF BATAVIA, NEW YORK.

WINDSHIELD FOR TRACK CARS.

Application filed October 8, 1924. Serial No. 742,465.

This invention relates to an improved windshield for section cars or motor track cars as they are prevalently called, and seeks to provide a windshield which may be readily attached to any conventional car of the character indicated and which will serve to efficiently shield the occupants of the car against the wind or flying objects.

As is well known, motor track cars are often operated at considerable speed and since these cars are not equipped with windshields, the necessity of the occupants of such cars for protecting themselves against the wind, dust, and flying insects which are caused to strike the face with stinging force, becomes a real problem. The present invention, therefore, seeks, as a further object, to provide a device which will effectually overcome the difficulties noted.

And the inventor seeks, as a still further object, to provide a windshield which will not restrict the seating capacity of the car and which may be tilted rearwardly for lessening the wind resistance of the device.

Other and incidental objects will appear hereinafter.

In the drawings:

Figure 1 is a side elevation showing my improved windshield applied to a conventional motor track car, Figure 2 is a front elevation, Figure 3 is a perspective view showing the windshield in detail, Figure 4 is an enlarged fragmentary sectional view on the line 4—4 of Figure 2, looking in the direction indicated by the arrows, and Figure 5 is a fragmentary edge elevation showing a slight modification of the invention.

Referring now more particularly to the drawings, I have, for convenience, shown my improved windshield in connection with a conventional motor track car 10. This car is equipped with the usual sills 11 and upstanding at the forward end of the car is the customary guard 12. In accordance with the present invention, I employ a dash 13 which may be of sheet metal and, as shown in Figure 2, is of a width to fit between the forward ends of the sills 11. The dash is curved or bowed forwardly and secured to the dash at its forward side is a plurality of reinforcing straps 14, the lower ends of which are extended below the lower edge of the dash and are bent to provide hinge loops 15. Extending through said hinge loops and through the sills 11 of the car is a hinge rod 16 hingedly connecting the windshield with the car. As particularly brought out in Figure 2 of the drawings, the rod 16 is equipped at one end with a nut removably securing the rod in position.

Riveted or otherwise secured to the upper margin of the dash 13 is an oblong frame 17 divided centrally by a transverse center rail 18. As shown in Figures 3 and 4, the frame 17 is preferably formed of angle iron while the center rail 18 is formed from a length of T-iron. Preferably, the angle iron of the frame comprises a relatively narrow flange 19 which is presented forwardly and a somewhat wider flange 20 which extends rearwardly and, as will be observed, the dash 13 is secured to the flange 19 of the lower rail of the frame. Furthermore, attention is directed to the fact that, as brought out in Figure 3, the end straps 14 are somewhat longer than the center straps to extend upwardly along the flanges 19 of the end rails of the frame so that these end straps serve to brace the frame and reinforce the connection between the frame and dash. The center rail 18 of the frame divides the frame into a pair of like windows and removably mounted in each of said windows is a transparency 21. Fitting in the windows of the frame beneath the transparencies 21 respectively, are cushioning strips 22 overlying the flanges 19 of the frame as well as the lateral flanges of the T-rail 18. These cushioning strips may be of wood, and overlying the margins of the transparencies to cooperate with the strips 22 for removably securing the transparencies in position, are retaining strips 23. The retaining strips are shaped to fit within the flanges 20 of the frame as well as within the center flange of the T-rail 18 and like the strips 20, may also be of wood. Extending through the strips 23 at suitably spaced points are bolts 24 removably securing the strips in position, the transparencies 21 being clamped between said strips and the strips 19. Extending through the dash near its upper corners and through the end straps 14, are bolts 25, and pivotally connected at their upper ends to said bolts are brace rods 26. Near their lower ends, the rods are bent to form rearwardly directed portions 27 and are then again bent to define inwardly directed lateral terminals 28 on which are formed eyes 29. Slidable through said eyes are clamping bolts 30 having lateral inner terminals 31 on which are formed eyes 32 slidably surrounding the portions 27 of the rods 26 and screwed upon said bolts are hand nuts 33. As brought out in Figure 1, the terminals 28 of the brace rods are disposed at the rear of the vertical side rods of the guard 12 while the terminals 31 of the bolts 30 are disposed at the forward sides of said side rods so that the side rods are freely received through the clamps formed at the rear ends of the brace rods by the rear terminals of said rods and said bolts. Accordingly, the nuts 33 may be adjusted for tightening said clamps and binding the terminals 28 of the rods as well as the terminals 31 of the bolts in engagement with the side rods of the guard so that the brace rods 26 will thus function to rigidly sustain the windshield at the front of the car. The device will thus serve to shield the occupants of the car against the wind, dust, or flying objects, and since the dash is curved forwardly with respect to the forward end of the car, the presence of the device upon the car will not restrict the seating capacity of the car. Furthermore, the curvature of the dash will tend to lessen the wind resistance of the device and, as shown in dotted lines in Figure 1, this resistance may be further lessened by adjustably tilting the windshield rearwardly. This adjustment of the windshield may be readily accomplished by loosening the nuts 33 and sliding the clamps at the rear ends of the rods 26 downwardly along the side rods of the guard 12.

In Figure 5 of the drawings, I have illustrated a slight modification of the invention wherein the dash is indicated at 34 and one of the bracing straps thereof at 35. In the modified structure, the dash is equipped with hinge plates 36 while the windshield frame, indicated at 37, is provided at its lower corners with hinge plates 38 mating with the plates 36 and pivotally connected thereto by bolts 39 which preferably carry handle nuts 40 so that the bolts may be readily tightened. Accordingly, as will be seen, the frame of the windshield may, when desired, be swung downwardly at the front of the dash to a position out of the way. If desired, the dash may be provided with only two of the bracing straps 35 instead of four of said straps, as illustrated in connection with the dash 13. Otherwise, this modified structure is identical with the preferred form of the invention and further description is accordingly believed unnecessary.

Having thus described the invention, what I claim is:

1. The combination with a track car having sills, and a guard upstanding near the forward end of said sills, of a windshield including a dash swingingly mounted at its lower end upon the forward ends of said sills, a frame carried by the dash, a transparency mounted in said frame, and brace rods extending between the dash and said guard sustaining the upper portion of the windshield.

2. The combination with a track car having sills of a windshield including a sheet metal dash mounted at its lower end upon the forward ends of said sills and curving forwardly and upwardly with respect thereto, a frame carried by the dash, a transparency mounted in said frame, and means extending between the dash and the car sustaining the upper portion of the windshield.

3. The combination with a track car having sills, and a guard upstanding with respect to said sills and provided with side rods, of a windshield including a dash swingingly mounted at its lower end upon the forward ends of said sills, a frame carried by the dash, a transparency mounted in said frame, and brace rods swingingly connected with the dash and provided at their rear ends with clamps embracing the side rods of the guard, the clamps being adjustable along said side rods for tilting the windshield with respect to the car.

4. The combination with a track car having an open body provided with a floor, of a windshield mounted upon the car and having a transparent upper portion and a metal lower portion extending to a point near the floor and forming a dash at the front of the body.

5. The combination with a track car having an open body, of a windshield mounted upon the car and having a transparent upper portion and a lower portion forming a dash at the front of the body, said lower portion being curved for deflecting air currents downwardly and rearwardly beneath the car.

6. A windshield for track cars including a transparent upper portion and a sheet metal lower portion adapted to form a dash extending adjacent the floor of the car at the front thereof, and means adjacent the lower edge of the dash for connecting the windshield with the car.

7. A windshield for track cars including a concavo-convex lower portion adapted to form a dash at the front of the car, a frame mounted upon said lower portion, a transparency seated in said frame, and retaining strips fixed to the frame and securing said transparency in position.

In testimony whereof I affix my signature.

ANDREW M. CLOUGH. [L. S.]